W. S. PRITCHARD.
TUBE CLOSING MECHANISM.
APPLICATION FILED MAR. 14, 1919. RENEWED MAR. 31, 1922.
1,424,180.
Patented Aug. 1, 1922.
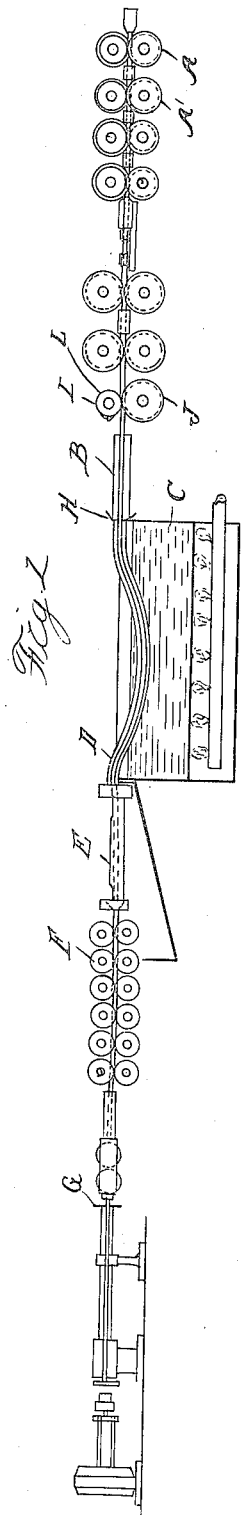
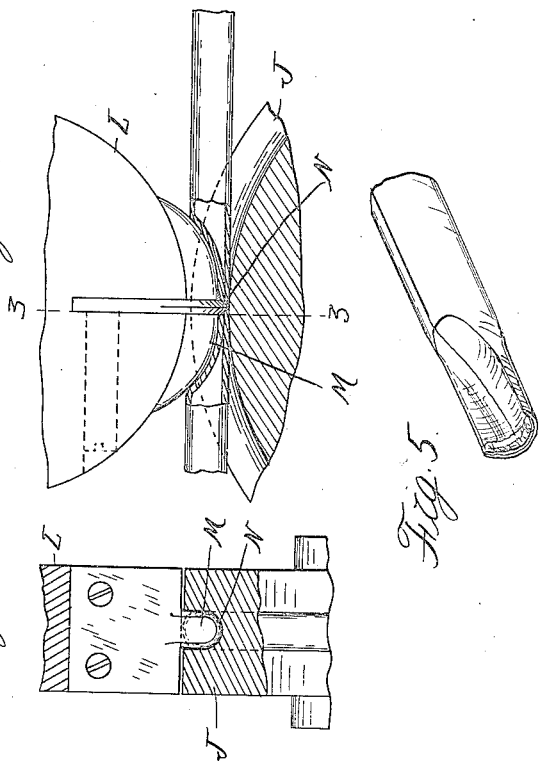
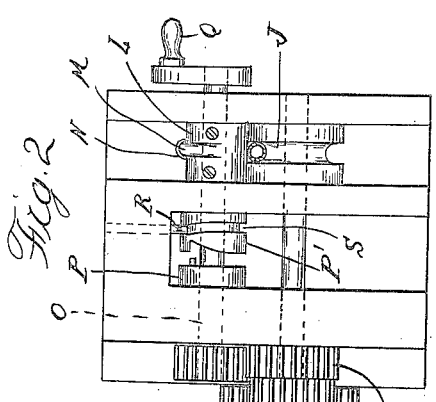
Inventor
William S. Pritchard
By Whittemore Hulbert & Whittemore
Attorneys

UNITED STATES PATENT OFFICE.

WILLIAM S. PRITCHARD, OF DETROIT, MICHIGAN, ASSIGNOR TO MOTOR PRODUCTS CORPORATION, OF DETROIT, MICHIGAN, A CORPORATION OF NEW YORK.

TUBE-CLOSING MECHANISM.

1,424,180.  Specification of Letters Patent.  Patented Aug. 1, 1922.

Application filed March 14, 1919, Serial No. 282,593. Renewed March 31, 1922. Serial No. 548,523.

*To all whom it may concern:*

Be it known that I, WILLIAM S. PRITCHARD, a citizen of the United States of America, residing at Detroit, in the county of Wayne and State of Michigan, have invented certain new and useful Improvements in Tube-Closing Mechanism, of which the following is a specification, reference being had therein to the accompanying drawings.

The invention relates to the manufacture of seamed tubing from sheet metal strips, the same being mechanically locked and also soldered. The soldering is effected by the passage of the tube through a solder bath by a continuing movement after it is delivered from the tube forming mechanism. To avoid waste of solder and also clogging of the tube, it is desirable to close the forward end so as to preclude the entrance of any solder inside of the tube. At the same time it is necessary to avoid any widening of the end of the tube, which would interfere with proper guiding through the soldering bath and other devices associated therewith.

The present invention is designed to effect the closing of the tube without enlarging any dimension of the cross-section, and to this end the invention consists in the construction as hereinafter shown and described.

In the drawings:

Figure 1 is a diagrammatic view showing the advancement of the tube through the forming mechanism, soldering bath and associated devices and indicating the position of my improved closing mechanism;

Figure 2 is an elevation at right angles to Figure 1 showing the closing mechanism;

Figure 3 is a cross-section on line 3—3 Fig. 4;

Figure 4 is a section in the longitudinal central plane;

Figure 5 is a perspective view showing the closed end of the tube.

The tube forming mechanism may be of any suitable construction, and, as shown, A, A', etc. are forming rolls which successively fashion the sheet metal strip and deliver it as a locked seamed tube. B is a fluxing device for the advancing tubing, C is the soldering bath which is provided with a tubular guide D for deflecting the advancing tubing below the level of the solder, which finds access through perforations in the guide. E is a washing and cooling device for the tubing after leaving the soldering bath, F are rolls for straightening the tube and G is a cutting off mechanism. The metallic strip is advanced through the machine by the rolls A, A', etc. and F, but in passing into each succeeding portion of the apparatus the forward end of the tube must be properly guided. Thus, as shown, a flaring mouth piece H is arranged at the entrance of the guide D, and similar flaring mouth pieces are arranged at each of the succeeding devices through which the tube passes. The tube closing mechanism is arranged at I intermediate the forming mechanism and the fluxing device and is constructed as follows:

J is a grooved roll for receiving the tube, said roll being driven at the proper peripheral speed by driving gears K. L is a roll which is normally stationary and which is arranged adjacent to the roll J. being provided with a projecting lug M carrying a shearing blade N. The lug M is fashioned to conform to the shape of the groove in the roll J. with sufficient clearance for a double thickness of the metal, from which the tubing is formed. O is a shaft driven from the gears K and carrying a clutch P, one member of which is constantly revolved. The co-operating member P' of the clutch P is attached to the roll L, both of these members being preferably sleeved upon the shaft O. Q is a crank handle for slightly rotating the roll L and member, P', and R is a pin engaging a cam groove S in the member P' to actuate the latter into and out of engagement with the driven member P. The arrangement is such that the member P' is normally held stationary in a position where the pin R engaging the cam slot S holds the clutch member P' out of engagement with the member P. If, however, the member P' is slightly rotated the cam slot will force the member P' into the path of the driving member P so as to effect the coupling, and revolve both the member P' and the roll L through a single revolution. At the completion of this revolution the pin R re-engaging the portion of the cam with which it was originally engaged will move the member P' out of the path of the member P, thereby stopping further revolution of the roll L.

In operation whenever a new strip is introduced into the tube forming mechanism it will be passed through the succeeding forming rolls and delivered therefrom as a completely formed and seamed tubing. As the forward end passes into engagement with the grooved roll J the operator actuates the crank handle Q sufficiently to cause the engagement of the clutch P, whereupon the roll L is revolved and the lug M presses down the upper wall of the tubing into close contact with the lower wall thereof. At the same time the severing plate N will cut off whatever portion of the tube has already passed beyond the roll J, and the edges of the metal along the line of severance are so tightly pressed together as to form a liquid tight seal. Inasmuch as the width of the groove in the roll J is no greater than the diameter of the tube the end of the tube will not be enlarged in dimension by this closing operation, and consequently during its further advancement through the machine it will pass with ease through the guides without interference.

What I claim as my invention is:—

1. The combination with mechanism for continuously advancing a tube, of means operating upon the advancing tube for completely closing the end thereof.

2. The combination with mechanism for continuously advancing a tube, of means operating upon the advancing tube for simultaneously severing said tube and closing the end thereof.

3. The combination with mechanism for continuously advancing a tube, of means for pressing one side of the tube at one point in its length into contact with the other side without distortion of the latter.

4. A tube closing device, comprising means for resting one segment of the tube into the other segment and for simultaneously severing the tube along the line of contact common to the two severed parts.

5. A tube closing device, comprising means for advancing a tube and means operating upon the advancing tube for intermittently pressing one side thereof into conformity to the opposite side without interference with the advancement.

6. The combination with tube advancing mechanism, of a guide through which the tube is advanced for maintaining the shape of one half of said tube, and means operating upon the advancing tube for pressing the opposite half of the tube into conformity to the guided half.

7. The combination with tube advancing mechanism, of a grooved guide with which the advancing tube is engaged, and a rotatable member having a projecting portion for engaging the tube in said guide during advancement to press one half thereof into conformity to the opposite half.

8. The combination with tube advancing mechanism, of a grooved guide through which the advancing tube is passed, a rotatable member having a projecting portion for engaging the advancing tube while in said guide to press one side of the tube into conformity with the other side and for simultaneously severing the tube along the line of contact between the sides thereof.

9. The combination with tube advancing mechanism, of rotary tube closing mechanism, a manually operable trip for starting the operation of said tube closing mechanism when the tube is in operative relation thereto, and means for automatically rendering said trip inoperative upon completion of the closing operation.

10. A tube closing mechanism, comprising a grooved roll, a co-operating roll provided with a die member for closing the tube during each rotation of the roll, means for constantly driving the grooved roll, and a trip mechanism for intermittently driving the co-operating roll through a single revolution.

11. The combination with mechanism for continuously advancing a tube, of means for pressing portions of the wall of said tube together to close the cross section thereof, said means maintaining all portions of the pressed wall within their original contour.

In testimony whereof I affix my signature.

WILLIAM S. PRITCHARD.